(12) United States Patent
Schmid

(10) Patent No.: US 11,362,919 B2
(45) Date of Patent: Jun. 14, 2022

(54) METHOD AND DEVICE FOR MONITORING DATA RELATED TO BROADCASTING AND/OR STREAMING

(71) Applicant: Rohde & Schwarz GmbH & Co. KG, Munich (DE)

(72) Inventor: Bjoern Schmid, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 152 days.

(21) Appl. No.: 15/937,478

(22) Filed: Mar. 27, 2018

(65) Prior Publication Data

US 2018/0287917 A1    Oct. 4, 2018

(30) Foreign Application Priority Data

Mar. 28, 2017   (EP) .................................... 17163288

(51) Int. Cl.
| | |
|---|---|
| *H04L 43/0823* | (2022.01) |
| *H04N 21/454* | (2011.01) |
| *H04N 21/439* | (2011.01) |
| *H04N 21/442* | (2011.01) |
| *H04N 21/44* | (2011.01) |
| *H04L 43/16* | (2022.01) |

(52) U.S. Cl.
CPC .......... *H04L 43/0823* (2013.01); *H04L 43/16* (2013.01); *H04N 21/4394* (2013.01); *H04N 21/442* (2013.01); *H04N 21/44008* (2013.01); *H04N 21/454* (2013.01)

(58) Field of Classification Search
CPC . H04L 43/0823; H04L 43/16; H04N 21/4394; H04N 21/44008; H04N 21/442; H04N 21/454

See application file for complete search history.

(56) References Cited

U.S. PATENT DOCUMENTS

2004/0213543 A1\* 10/2004 Onomatsu ............ H04N 5/4401
386/263
2006/0110129 A1\* 5/2006 Hamada ............. H04N 21/2541
386/260

(Continued)

FOREIGN PATENT DOCUMENTS

| CN | 103096127 B | 7/2014 |
|---|---|---|
| EP | 3119093 A1 | 1/2017 |

(Continued)

OTHER PUBLICATIONS

Extended European Search Report dated Jun. 9, 2017, issued in priority European Application No. 17163288.8, filed Mar. 28, 2017, 8 pages.

*Primary Examiner* — Nicholas R Taylor
*Assistant Examiner* — Sanjoy K Roy
(74) *Attorney, Agent, or Firm* — Christensen O'Connor Johnson Kindness PLLC

(57) ABSTRACT

A method for monitoring data related to broadcasting and/or streaming is described wherein broadcasting and/or streaming data are provided. At least one still image within the broadcasting and/or streaming data is detected in order to identify a possible error. The still image detected is compared with a whitelist of images. A still image alarm is suppressed provided that the still image detected is in the whitelist. Further, a device for monitoring data related to broadcasting and/or streaming is described.

10 Claims, 2 Drawing Sheets

(56) References Cited

U.S. PATENT DOCUMENTS

| | | | |
|---|---|---|---|
| 2008/0178288 A1* | 7/2008 | Alperovitch | H04L 63/0227 |
| | | | 726/22 |
| 2008/0196077 A1* | 8/2008 | Basse | H04N 21/6175 |
| | | | 725/116 |
| 2009/0147861 A1* | 6/2009 | Schnebly | G06T 1/0085 |
| | | | 375/240.27 |
| 2012/0260277 A1* | 10/2012 | Kosciewicz | H04N 17/004 |
| | | | 725/14 |
| 2015/0206422 A1* | 7/2015 | Priesterjahn | G08B 29/185 |
| | | | 348/150 |
| 2015/0281742 A1* | 10/2015 | Staudenmaier | H04N 7/183 |
| | | | 375/240.27 |
| 2016/0037186 A1* | 2/2016 | Wendel | H04N 19/89 |
| | | | 375/240.27 |
| 2016/0259975 A1* | 9/2016 | Saptharishi | G06K 9/00771 |
| 2016/0373449 A1* | 12/2016 | Haga | H04W 4/46 |

FOREIGN PATENT DOCUMENTS

| | | | |
|---|---|---|---|
| JP | 2004242223 A | 8/2004 | |
| WO | 2012/136260 A1 | 10/2012 | |
| WO | 2012136260 A1 | 10/2012 | |

* cited by examiner

METHOD AND DEVICE FOR MONITORING DATA RELATED TO BROADCASTING AND/OR STREAMING

FIELD OF THE DISCLOSURE

Embodiments of the present disclosure relate to a method for monitoring data related to broadcasting and/or streaming as well as a device for monitoring data related to broadcasting and/or streaming.

BACKGROUND

Broadcasting and/or streaming systems are known in the state of the art wherein these systems are used to generate a transport stream for transmitting inter alia video data to a customer. The video data comprise audio data as well as images. Further, the transport stream may have further data such as data tables, information related to electronic program guides and so on. In general, the different data used for generating a transport stream can be called broadcasting and/or streaming data.

On generation side, transport stream generating devices are known that monitor the broadcasting and/or streaming data in order to identify a possible error that might occur in the network used for broadcasting/streaming or in the transport stream generating devices themselves. For instance, a still image is detected in the broadcasting and/or streaming data wherein a still image alarm is output due to the still image detected in order to inform staff on the generation side. A still image means that the whole picture is frozen; not only sub-blocks or individual pixel groups of the whole picture. Accordingly, the still image could also be called a freeze image, freeze frame or still frame.

Sometimes still images are used for informing the customers, for instance by using a test image. Therefore, still images indicating "no signal", "no program" or "no broadcast" and the like may be intended by the operator. However, a still image alarm will be output as the still image is detected even though the still image is intended resulting in a false still image alarm. Accordingly, the staff has to turn off the still image alarm manually which requires some resources.

SUMMARY

Accordingly, there is a need for a method and a device that are able to verify if an error assumed in the broadcasting and/or streaming data is a real one in order to reduce the number of false alarms.

Embodiments of the present disclosure provide a method for monitoring data related to broadcasting and/or streaming with the following steps:

providing broadcasting and/or streaming data;

detecting at least one still image within the broadcasting and/or streaming data in order to identify a possible error;

comparing the still image detected with a whitelist of images; and suppressing a still image alarm provided that the still image detected is in the whitelist.

Further, embodiments of the present disclosure provide a device for monitoring data related to broadcasting and/or streaming, wherein the device comprises a still image detection unit configured to detect a still image in broadcasting and/or streaming data provided, a storage configured to store data related to images of a whitelist, and a comparison unit configured to compare the still image detected by the detection unit and the images of the whitelist stored in the storage, wherein the device is configured to suppress a still image alarm provided that the comparison unit determines that the still image detected is in the whitelist.

Accordingly, false alarms can be suppressed effectively by comparing the still image detected during the broadcasting and/or streaming with images being collected in the whitelist as the images being in the whitelist indicate that the still image detected is an intended one. Therefore, staff on the transport stream generating side does not have to interact with the transport stream generating device in order to turn off the alarm manually that would be a false one. Accordingly, the efficiency for generating transport streams is increased as less staff is needed for generating the transport stream. The comparison unit may comprise an image analysis unit for identifying certain features in the images, in particular wherein the image analysis unit uses digital image processing techniques. In a sophisticated version, image processing techniques are applied that can be used for identifying a person from their face.

According to an aspect, a still image alarm is output provided that the still image detected is not in the whitelist. Thus, it is ensured that the still image alarm is output in case that the still image detected has not been identified as an image of the whitelist comprising still images being intended by the operator. As the still image detected was not found in the whitelist, it is probable that an error on generation side occurs effectively. Thus, the still image alarm is output for warning/informing the staff.

Further, the whitelist may be predefined. For instance, the operator of the device may upload the whitelist to the transport stream generation device such that a set of different still images are provided immediately wherein these still images are intended to be used by the operator of the transport stream generating device, for example on transmission stream generation side or signal generation side.

According to an aspect, the images being in the whitelist are prerecorded images at least partly. The images of the whitelist can be generated easily by recording the images during broadcasting and/or streaming. Thus, the comparison unit is trained, for instance by the operator. Furthermore, the whitelist already uploaded can be added by recording further still images intended by the operator during broadcasting and/or streaming.

According to another aspect, a threshold value is provided that is used for comparing the still image detected and the images in the whitelist. For instance, the threshold value is a percentage quotation such as 90% that indicates the required matching of the still image detected and one of the images being in the whitelist during the comparison step. This ensures that a certain deviation may be allowed in order to reduce the amount of false alarms. This threshold value further ensures that image processing techniques can be used being less sophisticated while reducing the costs.

In some embodiments, the operator is enabled to set the threshold value. Thus, the operator may manually set the threshold value in order to implement one for the comparison unit. Further, the operator can amend the threshold value being preset such that the presetting is adapted to the purposes of the operator.

According to a certain embodiment, a loss of sound is detected within the broadcasting and/or streaming data in order to identify a possible error. It is further investigated if the broadcasting and/or streaming data have an error with regard to the audio data.

In some embodiments, the loss of sound detected is combined with the still image detection in order to verify if the loss of sound and the still image occur simultaneously. Thus, it is verified if only a loss of sound occurs or if the audio data and the image data both are blocked simultaneously.

Further, a silence alarm may be suppressed provided that the still image detected is in the whitelist. Hence, a silence alarm is not output provided that a loss of sound and a still image are detected simultaneously wherein the still image corresponds to an image being in the whitelist. Accordingly, it is concluded that the still image detected is an intended one such that no sound shall be provided.

Moreover, a silence alarm may be output provided that the still image detected is not in the whitelist. Accordingly, a real error in the transmission of the broadcasting and/or streaming data occurs probably. The staff on the transport stream generating side is informed appropriately such that the staff is instructed to check the broadcasting and/or streaming data with regard to the audio data. In some embodiments, the silence alarm and the still image alarm are output simultaneously such that the staff is instructed to check both data.

According to another aspect, a silence alarm is output provided that no still image is detected simultaneously. Hence, an error occurs in the broadcasting and/or streaming data that is related to the audio data as the image data of are accurate.

According to an aspect, the device comprises a loss of sound detection unit that is configured to detect a loss of sound in the broadcasting and/or streaming data. The loss of sound detection unit may be formed separately with regard to the still image detection unit. Alternatively, a single detection unit may be provided that comprises both functions, namely the still image detection function as well as the loss of sound detection function. In general, the loss of sound detection unit is configured to check the broadcasting and/or streaming data with regard to the audio data in order to determine a loss of sound that might be an error.

According to another aspect, the still image detection unit and the loss of sound detection unit interact with each other such that a silence alarm is suppressed provided that a still image alarm is suppressed. In case that the still image alarm is suppressed, it is assumed that the still image detected corresponds to an image being in the whitelist. Therefore, it is further concluded that no sound shall be provided while providing an intended still image like a test image. Therefore, the silence alarm is suppressed as the silence within the broadcasting and/or streaming data is deemed to be intended.

Furthermore, the device may be configured to perform a method as mentioned above. The advantages mentioned above also apply to the device in a similar manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
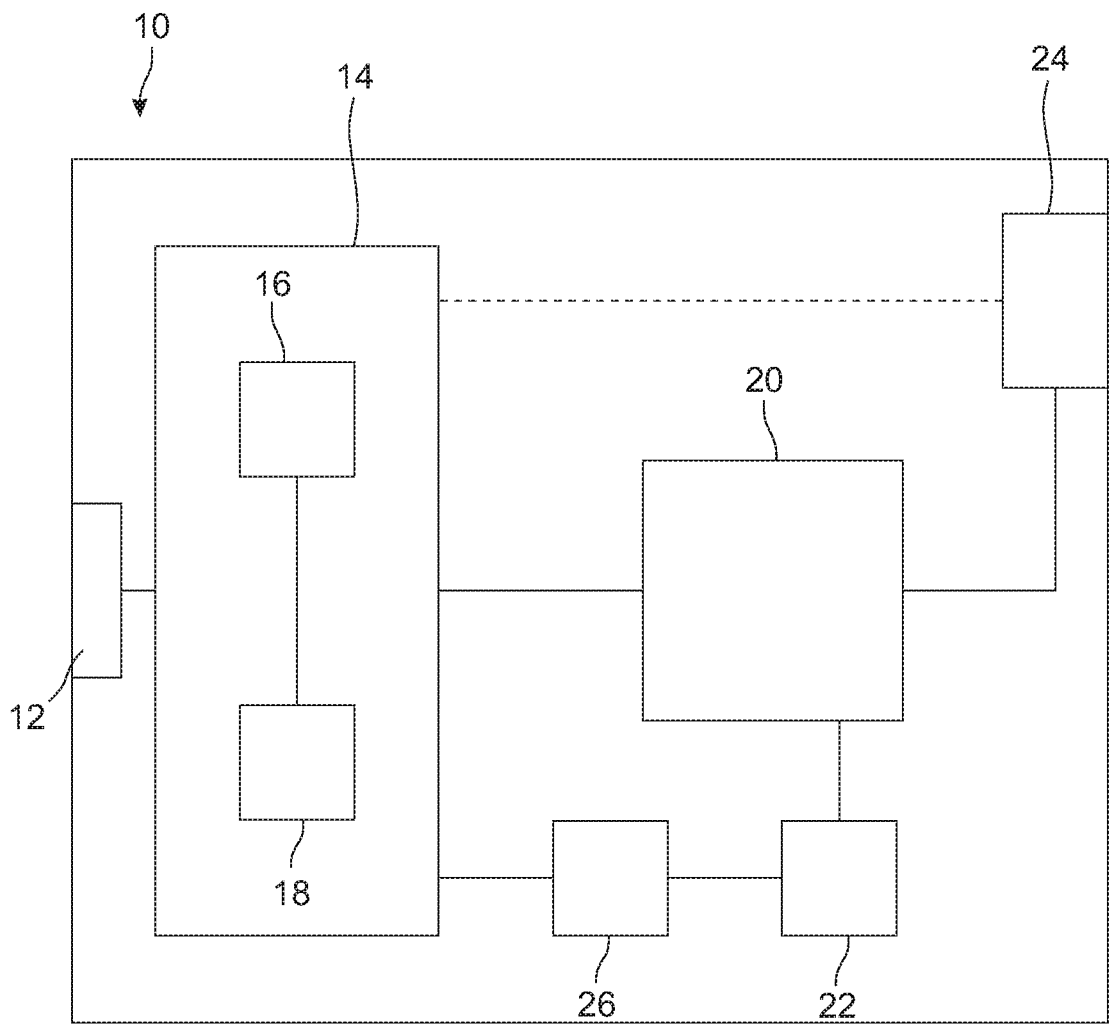
FIG. 1 schematically shows a device according to an aspect of the disclosure.

In FIG. 1, a device 10 for monitoring data related to broadcasting and/or streaming is schematically shown that comprises an input 12 for receiving broadcasting and/or streaming data. The device 10 may be configured to generate a transport stream comprising the broadcasting and/or streaming data to be transmitted to the customer appropriately. Accordingly, the device 10 may be called a transport stream generating device.

The input 12 of the device is connected to a detection system 14 wherein the data received is forwarded to the detection system 14 that comprises a still image detection unit 16 and a loss of sound detection unit 18. The detection system 14 is connected to a comparison unit 20 that is further connected with a storage 22 comprising data being used for comparison purposes.

The device 10 also has an alarm unit 24 that is connected to the comparison unit 20 as well as to the detection system 14. Generally, the alarm unit 24 is configured to output an alarm provided that the comparison unit 20 or the detection system 14 commands the alarm unit 24 appropriately as will be described later.

The device 10 also comprises a pre-recording unit 26 that is connected with the detection system 14 and the storage 22. In the storage 22, still images are stored that are in a whitelist defined by the operator of the device 10. These still images are intended by the operator of the device 10 during broadcasting and/or streaming for informing the customers, for instance by showing a test image or a still image indicating "no signal", "no program" or "no broadcast".

Figure 2:
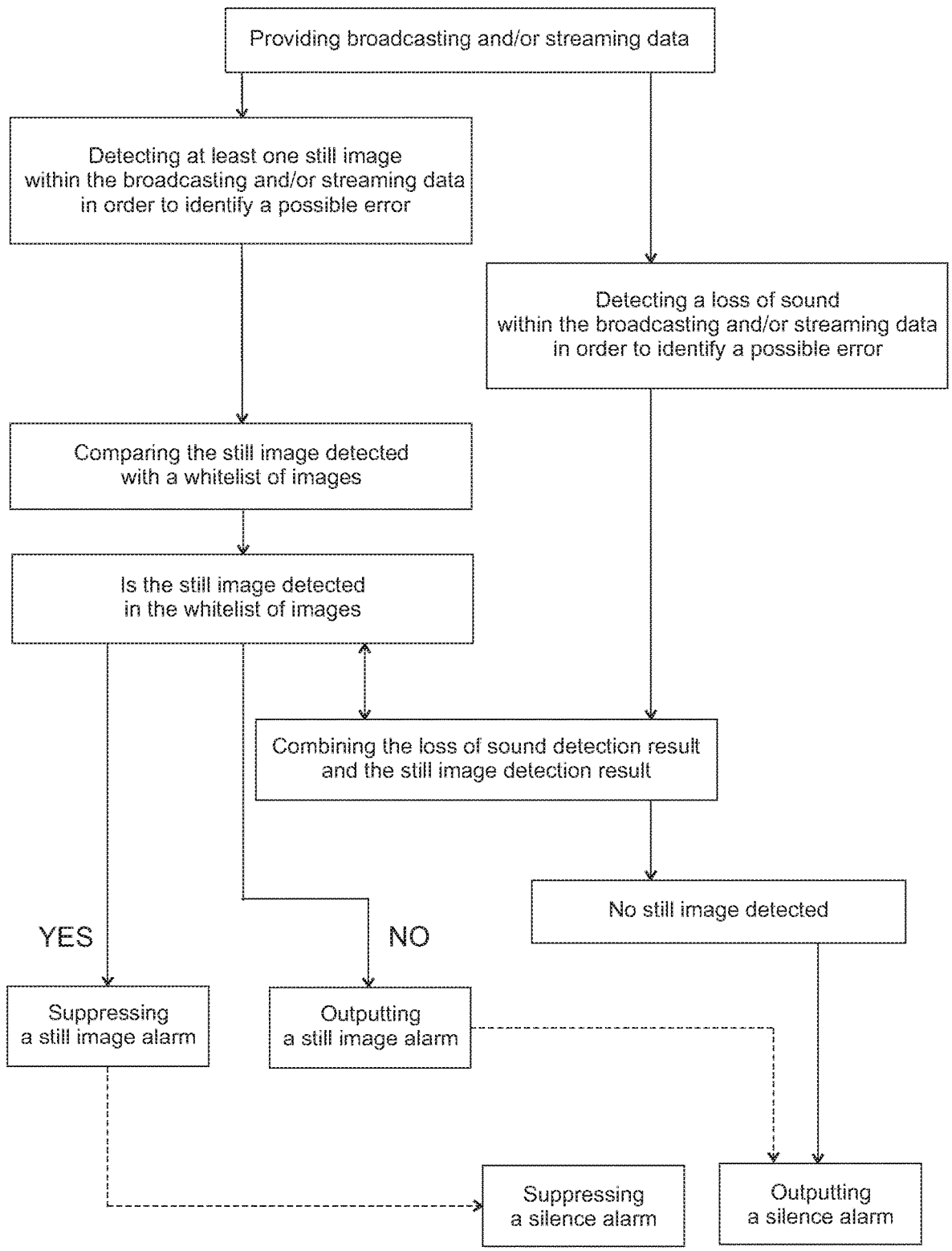
FIG. 2 schematically shows a flow chart of a method according to an aspect of the disclosure.

The function of device 10 will now be described with reference to FIG. 2 showing a method for monitoring data related to broadcasting and/or streaming while using the device 10.

The broadcasting and/or streaming data forwarded to the device 10 via the input 12 is analysed within the detection system 14, for example, by the still image detection unit 16 and the loss of sound detection unit 18. Accordingly, it is verified by the still image detection unit 16 if a still image occurs within the broadcasting and/or streaming data provided that might indicate a possible error on the signal generation side.

Provided that a still image is detected within the data received by the still image detection unit 16, the still image detection unit 16 may output a command to the alarm unit 24 and forwards the still image detected to the comparison unit 20 simultaneously. Of course, in other embodiments, the still image detection unit 16 may output a command to the alarm unit 24 and forwards the still image detected to the comparison unit 20 serially as well.

The comparison unit 20 has access to the storage 22, for example the images being stored in the storage 22, such that the comparison unit 20 is enabled to compare the still image detected by the detection unit 16 with all images being in the whitelist in order to identify if the still image detected corresponds to one of the whitelist. For comparing the images, the comparison unit 20 uses image processing techniques implemented in hardware, software, or a combination of hardware and software.

The still image alarm of the alarm unit 24 is blocked as long as the comparison unit 20 has not finished the comparison. In case the comparison unit 20 identifies an image in the whitelist corresponding to the still image detected, a still image alarm is suppressed by commanding the alarm unit 24 appropriately via the comparison unit 20. In case that the comparison unit 20 does not find an image within the whitelist that corresponds to the still image detected, the still image alarm is unblocked such that a still image alarm is output. Accordingly, the comparison unit 20 commands the alarm unit 24 appropriately.

Alternatively, the still image detection unit 16 does not command the alarm unit 24 such that it is not necessary to block the still image alarm for a certain time as the still image alarm is initiated by the comparison unit 20 directly after having determined that the still image detected does not correspond to any of the images of the whitelist.

In general, the comparison unit 20 may comprise a threshold value being used during the comparison of the still image detected and the images stored in the storage 22. The threshold value may be a percentage value that indicates the degree of identity being sufficient for suppressing the still image alarm. For instance, the threshold value is about 90%. Other threshold values may be employed. The threshold value can be set by the operator appropriately. In some embodiments, the operator may amend a pre-set threshold value manually.

In general, the whitelist may be uploaded to the device 10, for example the storage 22, such that the data related to the whitelist, in particular the images of the whitelist, are stored within the storage 22. Hence, the images of the whitelist may be predefined.

Further, the operator may pre-record still images intended in order to add these images to the whitelist or to create the whitelist. For this purpose, the operator of the device 10 may use the pre-recording unit 26 that has access to the data forwarded via the detection system 14. Hence, the operator may record one of the still images detected by the still image detection unit 16 in order to indicate that the still image detected is an intended one. Thus, the prerecording unit 26 saves the still image detected within the storage 22 such that this still image belongs to the whitelist.

Furthermore, the detection system 14 may also check if the audio data being part broadcasting and/or streaming data are accurate while using the loss of sound detection unit 18 being part of the detection system 14. The loss of sound detection unit 18 is configured to detect a loss of sound in the broadcasting and/or streaming data in order to identify a possible error with regard to the sound, in particular the audio data.

Provided that the loss of audio detection unit 18 detects a loss of sound, the audio detection unit 18 interacts with the still image detection unit 16 in order to verify if the loss of sound and the still image both occur simultaneously. Accordingly, the loss of sound detection result and the still image detection result are combined appropriately. In case that only a loss of sound occurs (no still image detected), the detection system 14 outputs an appropriate command to the alarm unit 24 in order to output a silence alarm for informing the staff accordingly.

In case that the still image detection unit 16 detects a still image simultaneously, it is verified if the still image corresponds to a still image being in the whitelist as described above. These constellations are indicated by the dashed lines in FIG. 2.

Provided that the still image corresponds to a still image being in the whitelist, the silence alarm is suppressed by the comparison unit 20 appropriately since the silence (loss of sound) is deemed to be intended as only a still image shall be provided. Otherwise (still image detected does not correspond to an image of the whitelist), a still image alarm and a silence alarm are output by the output unit 24 simultaneously. Accordingly, it is ensured that the number of false alarms is reduced since all still images intended can be detected by comparing the still images detected with the images of the whitelist.

As the number of false alarms is reduced, the resources of the staff can be minimized in order to turn off false alarms manually. Therefore, the generation of transport streams can be done in a more efficient manner.

It will be appreciated that several components, including but not limited to the still image detection unit 16, sound detection unit 18, comparison unit 20, etc., have been described herein as "processing" signals or that various signals are being "analyzed" or "compared" by such components. This analysis, comparison or processing can be carried out in embodiments of the present disclosure by analog circuitry, digital circuitry, or a combination of analog and digital circuitry, and can include discrete digital or analog circuit elements or electronics, or combinations thereof. Such circuitry is configured and arranged in order to implement the technologies and methodologies set forth herein.

These components may include, in some embodiments, logic for implementing the technologies and methodologies described herein. This logic can be carried out in either hardware or software, or a combination of hardware and software. In some embodiments, one or more components may include one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, one or more of these components includes a microprocessor and a memory storing logic modules and/or instructions. In an embodiment, one or more of these components includes one or more ASICs having a plurality of predefined logic components. In an embodiment, one or more of these components includes one or more FPGA having a plurality of programmable logic components. In an embodiment, one or more of these components includes hardware circuit implementations (e.g., implementations in analog circuitry, implementations in digital circuitry, and the like, and combinations thereof). In an embodiment, one or more of these components includes combinations of circuits and computer program products having software or firmware instructions stored on one or more computer readable memories that work together to cause a device to perform one or more methodologies or technologies described herein.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for monitoring data related to broadcasting and/or streaming, the method comprising:
providing a transport stream comprising broadcasting and/or streaming data, wherein the transport stream transmits video data to a customer, and wherein the broadcasting and/or streaming data has at least one still image, the at least one still image being either an intended still image that is not indicative of an error or an unintended still image that is indicative of an error;
detecting said at least one still image within the broadcasting and/or streaming data of the transport stream;
comparing the still image detected within the broadcasting and/or streaming data of the transport stream during the broadcasting and/or streaming with a preselected whitelist of intended still images by using image processing techniques, wherein the still image detected is compared with all images being in the whitelist in order to identify if the still image detected within the broadcasting and/or streaming data of the transport stream corresponds to one of the whitelist;
outputting a still image alarm automatically provided that the still image detected is not in the whitelist; and
suppressing a still image alarm automatically provided that the still image detected is determined to be one of said intended still images of the whitelist of intended still images, thereby suppressing a false still image alarm;
wherein a loss of sound is detected within the broadcasting and/or streaming data in order to identify a possible error, wherein the loss of sound detected is combined with the still image detection in order to verify if the loss of sound and the still image occur simultaneously, wherein a silence alarm is suppressed provided that the still image detected is in the whitelist, and wherein the silence alarm is output provided that the still image detected is not in the whitelist.

2. The method according to claim 1, wherein the whitelist is predefined.

3. The method according to claim 1, wherein the images being in the whitelist are prerecorded images at least partly.

4. The method according to claim 1, wherein a threshold value is provided that is used for comparing the still image detected and the images in the whitelist.

5. The method according to claim 4, wherein the operator is enabled to set the threshold value.

6. The method according to claim 1, wherein a silence alarm is output provided that no still image is detected simultaneously.

7. A device for monitoring data related to broadcasting and/or streaming,
wherein the device is configured to generate a transport stream comprising broadcasting and/or streaming data to be transmitted to a customer, wherein the transport stream transmits video data to a customer,
wherein the device further comprises:
a still image detection unit configured to detect a still image in the broadcasting and/or streaming data of the transport stream;
a storage configured to store images of a whitelist, the images of the whitelist indicative of intended still images; and
a comparison unit configured to compare the still image detected within the broadcasting and/or streaming data of the transport stream by the still image detection unit and the images of the whitelist stored in the storage by using image processing techniques during the broadcasting and/or streaming, wherein the still image detected is compared with all images being in the whitelist in order to identify if the still image detected within the broadcasting and/or streaming data of the transport stream corresponds to one of the whitelist,
the device being configured to output a still image alarm automatically provided that the still image detected is not in the whitelist and to suppress a still image alarm automatically provided that the comparison unit determines that the still image detected is one of the images in the whitelist, thereby suppressing a false still image alarm.

8. The device according to claim 7, wherein a loss of sound detection unit is provided that is configured to detect a loss of sound in the broadcasting and/or streaming data.

9. The device according to claim 8, wherein the still image detection unit and the loss of sound detection unit interact with each other such that a silence alarm is suppressed provided that a still image alarm is suppressed.

10. A method for monitoring data related to broadcasting and/or streaming, the method comprising:
providing a transport stream comprising broadcasting and/or streaming data, wherein the transport stream transmits video data to a customer, and wherein the broadcasting and/or streaming data has at least one still image, the at least one still image being either an intended still image that is not indicative of an error or an unintended still image that is indicative of an error;
detecting said at least one still image within the broadcasting and/or streaming data of the transport stream;
comparing the still image detected within the broadcasting and/or streaming data of the transport stream during the broadcasting and/or streaming with a preselected whitelist of intended still images, wherein the images being in the whitelist are prerecorded images at least partly, wherein a threshold value is provided that is used for comparing the still image detected and the images in the whitelist, and wherein the threshold value indicates the required matching of the still image detected and one of the images being in the whitelist during the comparison step; and
suppressing a still image alarm automatically provided that the still image detected is determined to be one of said intended still images of the whitelist of intended still images.

* * * * *